(12) United States Patent
Bär

(10) Patent No.: US 6,500,048 B1
(45) Date of Patent: Dec. 31, 2002

(54) METHOD FOR SEPARATING PROFILED FOILS

(75) Inventor: Martin Bär, Hettlingen (CH)

(73) Assignee: Sulzer Chemtech AG, Winterthur (CH)

(*) Notice: Subject to any disclaimer, the term of this patent is extended or adjusted under 35 U.S.C. 154(b) by 121 days.

(21) Appl. No.: 09/625,771

(22) Filed: Jul. 26, 2000

(30) Foreign Application Priority Data

Aug. 25, 1999 (EP) .............................................. 99810761

(51) Int. Cl.$^7$ ................................................ B24B 27/06
(52) U.S. Cl. ......................................... 451/28; 451/182
(58) Field of Search ........................ 451/28, 456, 182, 451/178

(56) References Cited

U.S. PATENT DOCUMENTS

| | | |
|---|---|---|
| 4,018,118 A | 4/1977 | Goff |
| 4,669,348 A | 6/1987 | Holder |
| 4,771,667 A | 9/1988 | Forman |
| 5,165,314 A | * 11/1992 | Paulson et al. ................ 83/29 |
| 5,327,805 A | 7/1994 | Reichental |

FOREIGN PATENT DOCUMENTS

| | | |
|---|---|---|
| DE | 2415212 | 10/1974 |
| DE | 2821884 | 11/1978 |

* cited by examiner

*Primary Examiner*—Robert A. Rose
(74) *Attorney, Agent, or Firm*—Townsend and Townsend and Crew LLP

(57) ABSTRACT

The method for separating a profiled foil (5) is carried out using a rotating separation foil (1) which forms a planar surface with a circular periphery (11). The separation foil is rotated (1a) about the circle center (10) and in the plane (10a), the foil plane, which is spanned by the surface. The periphery is brought into contact (15) with the profiled foil by the execution of a relative movement (1b). In this, through abrasion, material (6) is removed and a separation gap (51) is produced in the profiled foil. Material is largely removed from the profiled foil only.

11 Claims, 4 Drawing Sheets

METHOD FOR SEPARATING PROFILED FOILS

BACKGROUND OF THE INVENTION

The invention relates to a method for separating profiled foils, as well as to a use of the method and to a plant for carrying out the method.

Foils with a zigzag-shaped profiling are used as elementary constructional elements for ordered packings of separation columns, in which these foils are arranged adjacently to one another in vertical layers. Profiled foils of this kind are manufactured for example by means of a pleating method from a planar metal strip, with rectilinear folding edges resulting. The metallic strip is a thin foil with a thickness which amounts for example to 0.1 mm. As a rule this foil already has a fine structuring in the form of a grooving prior to the pleating. The pleated metal strip is separated into pieces, the lengths of which are determined by the installation conditions in the separation column. Since the folding edges are rectilinear a separation edge which has a periodic profile results in the separation. Due to this fact the metal strips can be cut to any desired lengths by means of a forming shear.

Whereas in an ordered packing which is constructed of pleated foils of this kind rectilinear flow channels are present—as a rule in the form of a cross channel structure—, in a modified form of this packing type the channels are no longer formed rectilinearly. In this the foils of the layers are profiled in such a manner that the channel edges are curved in edge zones. Metal strips which are provided with a profiling of this kind can no longer be cut by means of a forming shear into pieces of arbitrary length. This is a result of the fact that the profile of the separation edge is no longer periodic.

SUMMARY OF THE INVENTION

It is an object of the invention to create a means which is an alternative to a forming shear and which enables a separation of profiled metal strips for which the separation edges do not have a periodic profile.

The method for separating a profiled foil is carried out using a rotating separation foil which forms a planar surface with a circular periphery. The separation foil is rotated about the circle center and in the plane, the foil plane, which is spanned by the surface. The periphery is brought into contact with the profiled foil by the execution of a relative movement. In this, through abrasion, material is removed and a separation gap is produced in the profiled foil. Material is largely removed from the profiled foil only.

The separation foil can—in comparison with the metal strips of which the profiled foils are manufactured—be relatively thick. It can be a thin sheet metal which is several tenths of a millimeter thick. Whereas the profiled foil can be manufactured of a plastic, the material choice in the separation foil is restricted to metals for practical reasons. In pleated plastic foils the separation foil is advantageously thinner than the foil to be separated.

In the following the invention will be explained with reference to the drawings.

DESCRIPTION OF THE PREFERRED EMBODIMENTS

Figure 1:
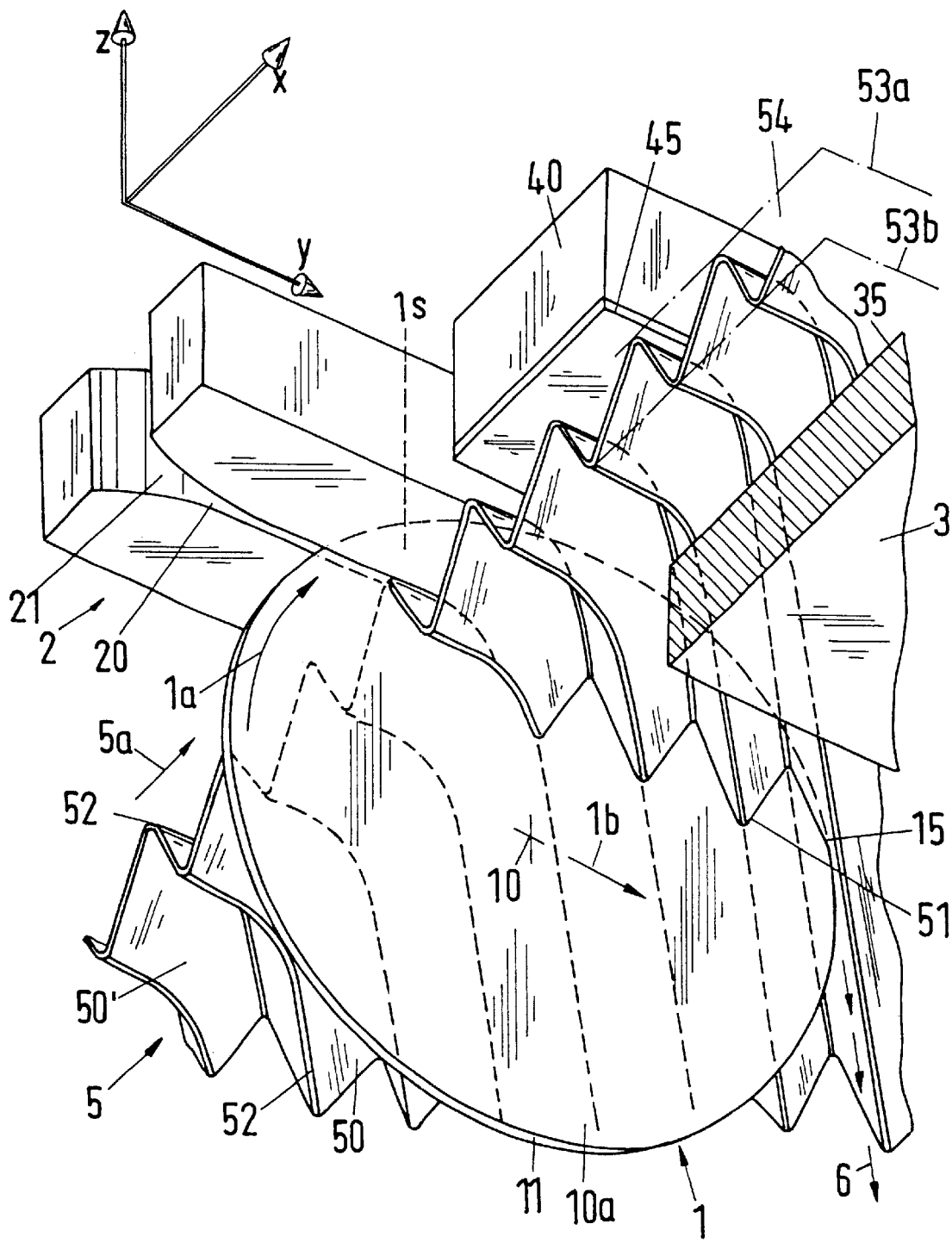
FIG. 1 shows a separation foil from below in simplified form and with which a profiled foil is separated in accordance with the invention.

FIG. 1 shows the separation foil 1 which is illustrated in a simplification as a circular disc having the center 10 and the periphery 11. For a better orientation x, y and z axes of an orthogonal coordinate system are shown. The arrows 1a and 1b indicate a rotation of the separation foil 1 about the center 10 and a translational movement of the center 10 respectively in the direction of the y axis. The foil plane, namely the plane spanned by the separation foil 1, is parallel to the y and z axes. An upper segment of a circle is of the separation foil 1 is guided within a gap 20 of a device 2. A profiled foil 5 is laid in between the upper side 35 of a support plate 3, which is only partly illustrated, and the guiding device 2 as well as a fixing beam 40. The separation process in accordance with the invention is illustrated in FIG. 1 at a time at which a material removal takes place at point 15. An already produced separation gap 51 momentarily ends at this point 15 at the periphery 11 of the separation foil 1. An abrasion, i.e. the removal material, which is set free there is indicated by arrows 6.

The profiled foil 5 is provided for a layer of a column packing containing channels 50. Edge lines 52 lie on two parallel surfaces 53a and 53b. The layer which is formed by the foil 5 has a side edge 54 which extends in the direction of the x axis. In an edge zone at the side edge 54 the channels 50 have curved partial pieces 50'. Due to this shaping of the edge zone it is not possible to use a forming shear in order to cut the foil 5 at an arbitrary position.

After the separation of the foil 5 the rotating separation foil 1 is drawn back into a waiting position outside the guiding device 2. The device 2 and the fixing beam 40 are lifted somewhat so that the separated foil piece can be removed and a new piece of the foil 5 can be advanced in the x direction (arrow 5a). Then the foil 5 is again fixed with the beam 40, which carries a rubber elastic layer 45 at its lower side. The visible end 21 of the guiding gap 20 is formed with a continuously widening gap width, so that due to this shaping, in the event of a further production of a separation gap 51, the separation foil can enter into the guiding gap 20 without contact.

Figure 2:
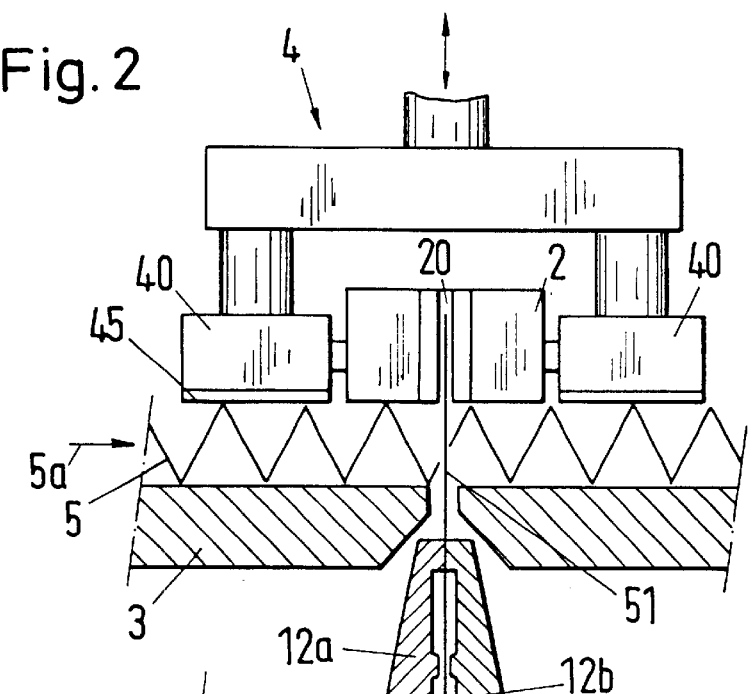
FIG. 2 shows details pertaining to a plant made in accordance with the invention.

FIG. 2 shows a part of a plant by means of which the method in accordance with the invention can be carried out. The separation foil 1 is releasably secured between two clamping plates 12a and 12b. The one clamping plate 12a is firmly connected to a non-illustrated drive shaft of a motor 70; the other clamping plate 12b can be removed through releasing a screw ring 14 for replacement of the separation foil 1. The clamping plates 12a and 12b are elastically deformable and carry ring-shaped elevations 13 at the clamping surfaces by means of which particularly large local clamping forces can be produced. The clamping force between the two clamping plates 12a and 12b can be further reinforced through additional, non-illustrated connection screws.

The profiled foil 5, which is pushed in in the direction of the arrow 5a, is fixed between the support plate 3 and a clamping device 4; the rotating separation foil 1 produces the separation gap 51 in the foil 5. Two fixing beams 40 with soft pressing layers 45 and the device 2 with the guiding gap 20 are parts of the clamping device 4 which can be moved up and down. The motor 70 is advantageously an asynchronous motor which can drive a shaft up to a speed of about 9000 rotations per minute.

Figure 3:
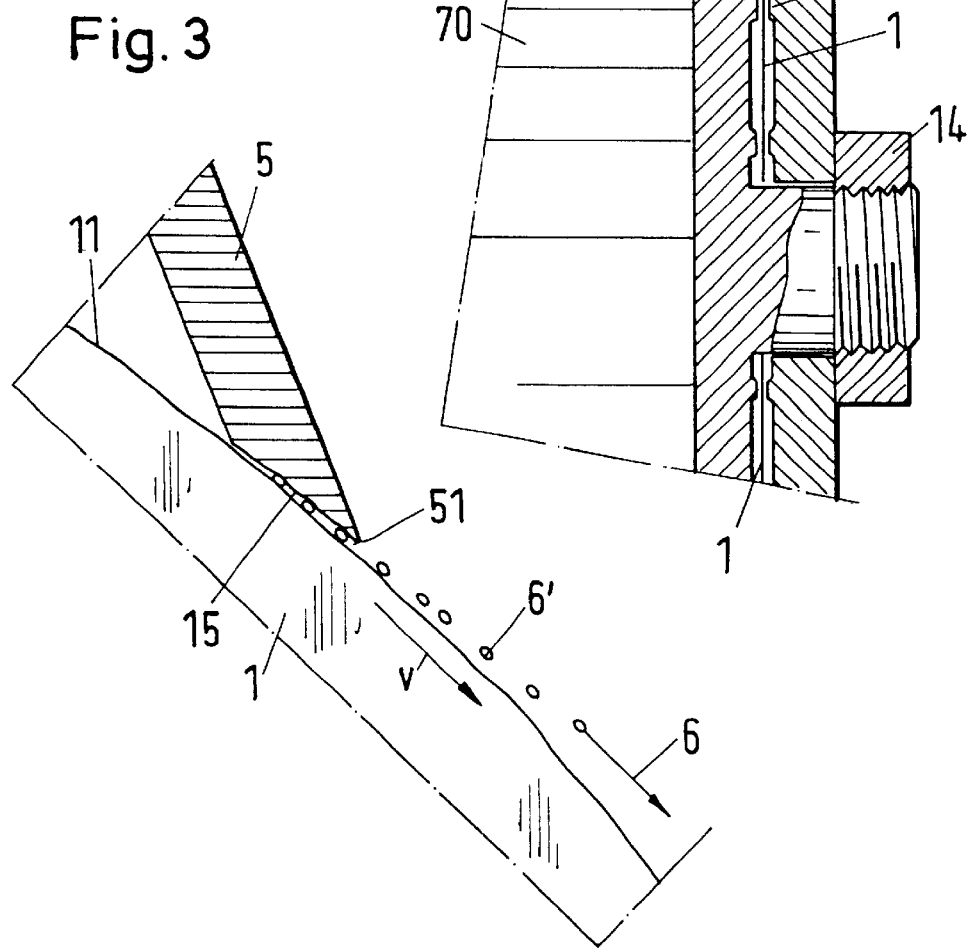
FIG. 3 illustrates the abrasion process in the separation of the profiled foil.

A value between 100 and 500 mm is chosen for the radius of the circular separation foil 1. The rotation of the separation foil 1 is empirically matched to the choice of the materials so that—see FIG. 3—the surface points of the periphery 11 move with a sufficiently high velocity v. The temperature of the profiled foil 5 increases at the abrasion location to high values which can lie in the vicinity of the melting point which the material of the foil 5 has. Under these circumstances particles 6' are sheared off out of the contact surface in the separation gap 51 which forms and are transported away from the latter (arrow 6). When the velocity v is sufficiently large a sharp-edged separation gap 51 forms, at the flanks of which practically no changes—for example discolorations—can be determined. The velocity v is set as low as possible so that a minimum material removal at the separation foil 1 results. In accordance with experience the peripheral velocity v is greater than about 50 m/s for a separation foil 1 and a profiled foil 5 which are both metallic and for which the thicknesses amount to 0.3 mm and 0.1 mm respectively.

Figure 4:
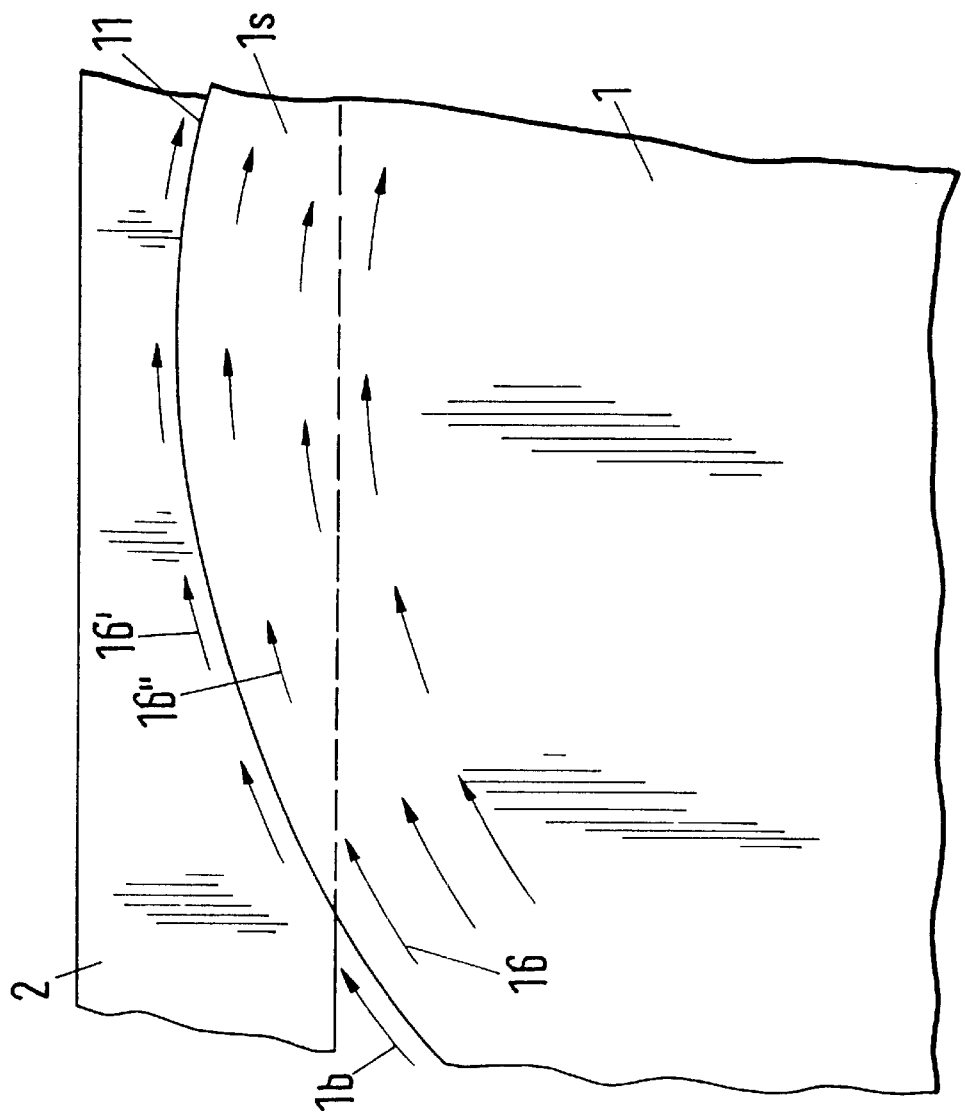
FIG. 4 is a partial side view taken along line IV—IV of FIG. 5 of the rotating separation foil with a representation of air which is carried along.
Figure 5:
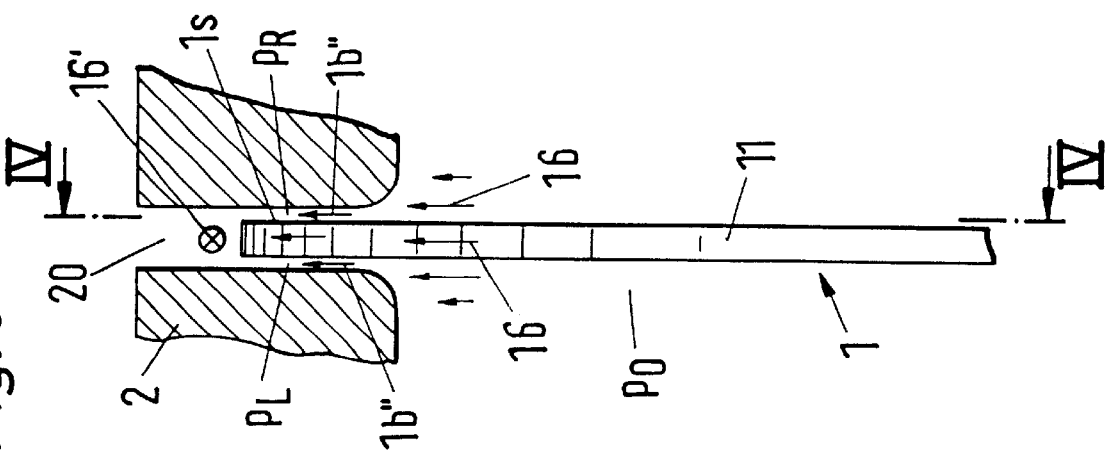
FIG. 5 is a view in the direction of the rotation plane of FIG. 4, and FIG. 6 schematically illustrates a plant constructed in accordance with the invention.

In the guiding gap 20—see FIGS. 4 and 5—the separation foil 1 is guided at the periphery 11 in the region of a segment-like part 1s without contact on air layers between the flanks of the gap 20 and the surfaces of the part 1s. A width for the gap 20 is chosen which is about 0,1 to 0.5 mm, preferably 0.15 to 0.25 mm greater than the thickness of the separation foil 1. Arrows 16, 16' and 16" represent the air which is entrained by the surface of the rotating foil 1. The air flow is strongly braked in the gap 2. Pressures $P_L$ and $P_R$ which are greater than the ambient pressure $p_o$ arise in the region of the segment-like part 1s. On the side of the segment-like part 1s on which the air layer is narrower, a greater braking of the air flow which is carried along results, which involves a greater pressure increase (FIG. 5: $P_L > P_R$). Through the thus arising pressure differences between the lateral air layers of the segment-like part 1s there results a centering of the foil 1 in the gap 20 and thus a contactless guiding through this gap 20.

Figure 6:
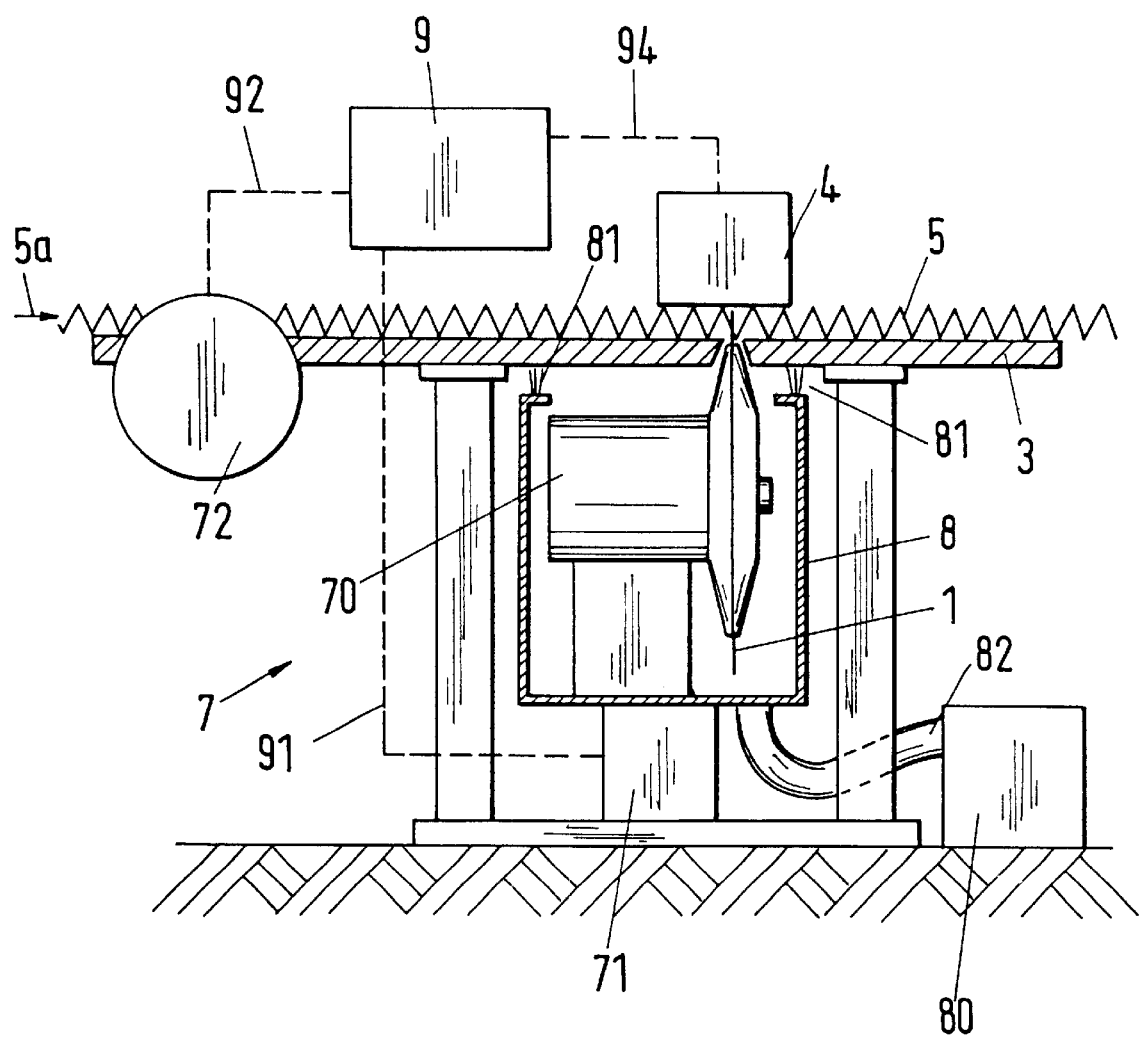

The plant 7 illustrated in FIG. 6 comprises the following components: a drive motor 70 for the separation foil 5; a linear motor 71 which is connected to the drive 70 and by means of which the relative movement 1b—see FIG. 1—can be executed; a clamping device 4 for the profiled foil 5 by means of which the latter can be fixed during the separation; a conveying device 72 for the profiled foil (conveying in the direction of the arrow 5a); furthermore a control device 9 for an automatic operation of the plant 7.

The clamping device 4 contains a non-illustrated linear motor for a lifting movement by means of which a change of state of the clamping device between an open and a closed state can be produced. It also contains the guiding device 2 (see FIG. 2). The control device 9 is connected via control lines 91, 92 and 94 to the components 71, 72 and 4 respectively.

The separation foil 1 is arranged together with its drive 70 in a casing 8. A suction device 80 for abraded material is advantageously connected up via a hose 82 to the casing 8. A sealing of the casing 8 in the form of brushes 81 is provided.

The method in accordance with the invention is particularly suitable for separating a profiled foil 5 which is produced by a forming from a planar, metallic material strip, with ridge lines 52 of the profiling being arranged on two mutually parallel planes 53a and 53b—see FIG. 1. This method can of course also be used in cases in which the use of forming shears is possible.

What is claimed is:

1. A method for separating a profiled foil comprising rotating a planar, circular separating foil in a rotational plane, holding the profiled foil at a cutting location, moving the rotating separating foil relative to the profiled foil so that a peripheral portion of the separating foil forms a cut through the profiled foil, forming a stabilization gap between opposing stationary walls at the cutting location in substantial alignment with the separating foil, arranging the walls to provide a spacing between the walls which is 0.1 to 0.5 mm greater than a thickness of the separating foil, and stabilizing the rotating separating foil by moving a segment of the rotating separating foil through the stabilization gap so that air pressure forms on each side of the separating foil segment disposed in the stabilization gap and centers the foil in the gap to prevent contact between the rotating separating foil and the walls.

2. A method according to claim 1 wherein arranging comprises providing a spacing between the walls which is 0.15 to 0.25 mm greater than the thickness of the separating foil.

3. A method according to claim 1 wherein the profiled foil and the separating foil are metallic foils and the thickness of the separating foil is greater than a thickness of the profiled foil.

4. A method according to claim 1 wherein moving comprises translating the separating foil along the rotational plane.

5. A method according to claim 3 wherein the rotating separating foil has a peripheral velocity greater than about 50 m/s, the separating foil has a thickness of about 0.3 mm, and the profiled foil has a thickness of about 0.1 mm.

6. A method according to claim 1 wherein the profiled foil is made from a planar strip of material and includes ridge lines located in two parallel planes, and wherein holding the profiled foil comprises engaging the ridge lines with a holder.

7. A plant for separating a profiled foil by rotating a planar, circular separating foil in a rotational plane and cutting the profiled foil at a cutting location, the plant comprising a drive for rotating the separating foil at the cutting location, a linear motor coupled with the drive for moving the profiled foil and the separating foil relative to each other, a holder for fixing the profiled foil at the cutting location, first and second, parallel, opposing, spaced-apart walls defining a stabilization gap between them at the cutting location which is in substantial alignment with the separating foil, a spacing between the walls being 0.1 to 0.5 mm greater than a thickness of the separating foil so that, during operation of the plant, air pressure forms on each side of the separating foil segment in the stabilization gap and centers the foil in the gap to prevent contact between the rotating separating foil and the walls, a conveyor for moving the profiled foil to the cutting location, and a control device for automatically operating the plant.

8. A plant according to claim 7 including a waiting position for the separating foil spaced from the cutting location, wherein the linear motor moves the separating foil along the stabilization gap between the cutting location and the waiting position, and wherein an end of the gap proximate the waiting position widens in a direction towards the waiting position to prevent contact between the separating foil and the walls when the separating foil is moved from the rating position to the cutting location.

9. A plant according to claim 7 including first and second clamping plates for releasably securing the separating foil to a drive shaft of the drive, the first plate being immovably connected to the drive shaft and the second clamping plate being removably connected to the drive shaft.

10. A plant according to claim 7 including a housing, wherein the drive and the separating foil are disposed in the housing for receiving material abraded during separating the profiled foil, a seal sealing an interior of the housing from the exterior, and a suction device in fluid communication with the housing for removing therefrom cuttings produced during separating the profiled foil.

11. A plant according to claim 10 wherein the seal comprises brushes.

* * * * *